April 12, 1938.  L. F. BIRD  2,114,163
INTENSITY METER FOR ULTRAVIOLET RAYS
Original Filed May 23, 1936
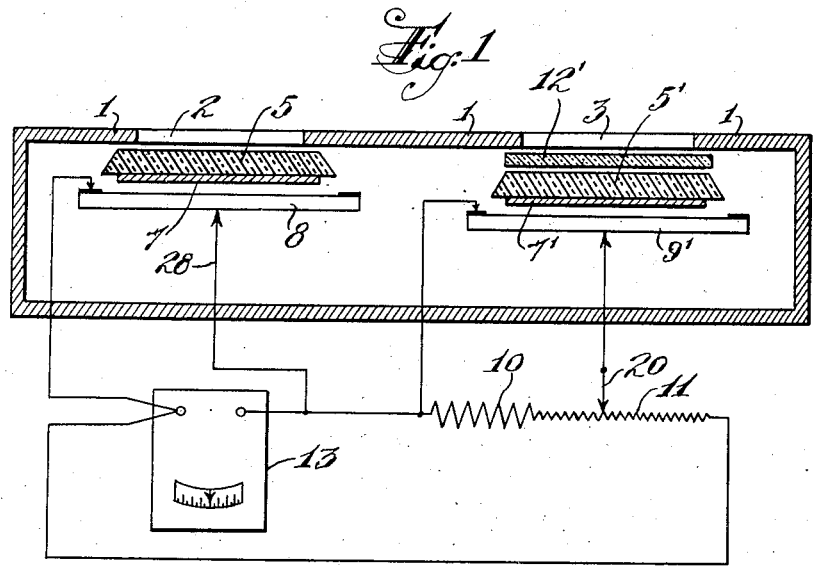
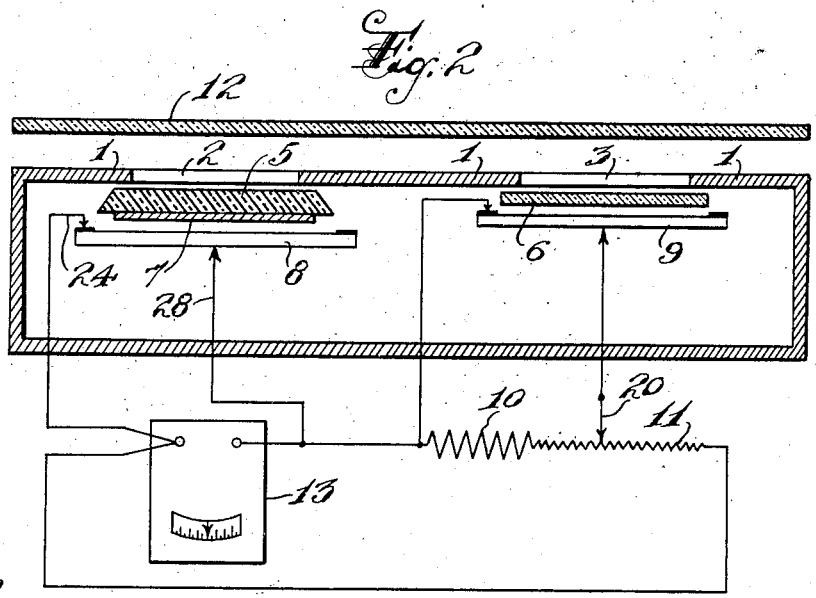
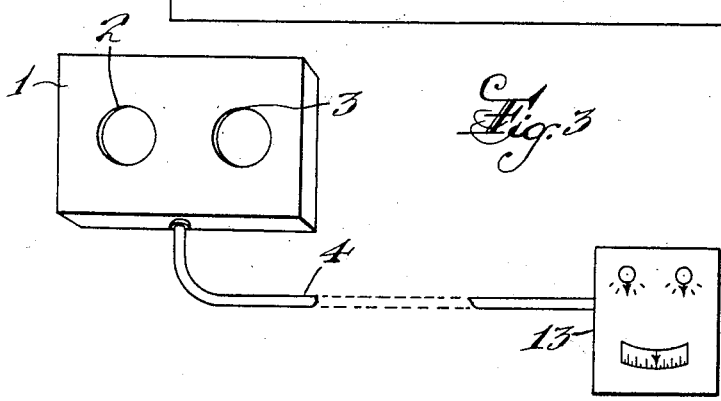
INVENTOR
Lester F. Bird
BY Jack C. Fischer
ATTORNEY Patented Apr. 12, 1938

2,114,163

UNITED STATES PATENT OFFICE 2,114,163

INTENSITY METER FOR ULTRAVIOLET RAYS

Lester F. Bird, Newark, N. J., assignor to Hanovia Chemical and Manufacturing Company, Newark, N. J., a corporation of New Jersey Application May 23, 1936, Serial No. 81,411
Renewed November 12, 1937

8 Claims. (Cl. 250—34)

This invention relates to devices for indicating the intensity of ultraviolet rays; and more particularly to a meter suitable for the measurement of ultraviolet rays in a therapeutic region and such regions that are useful in the production of vitamin D and sunburn.

The meters which have heretofore been employed in the measurement of ultraviolet rays have been found unreliable and unsatisfactory in that such meters are responsive to undesired regions of the spectrum or else they do not respond uniformly to the desired regions. Meters of the type heretofore used have employed sodium cells, uranium cells, barrier type photocells, and other devices with or without filters.

It is an object of this invention to provide a metering device for ultraviolet rays which is uniformly sensitive to ultraviolet energy lying between 2000 and 3200 Angstrom units, and which is unresponsive to all other regions of a spectrum. That is, the meter will not respond to any radiations above 3200 Angstrom units.

A further object is the provision of a device for measuring short ultraviolet rays which is simple in operation and positively reliable inasmuch as it is incapable of indicating the radiations in any other region of the spectrum.

In accordance with my invention two photocells are mounted within a common holder and arranged to receive light from separate optical systems. The nature of the cells and their response characteristics are not important except that they must be responsive to light in the visible spectrum. The optical systems may or may not be similar, but the response of one photocell must result in part at least from any short ultraviolet components in the light incident on the receiver while the response of the other cell must be entirely the result of the long ultraviolet and visible components of the incident light. The optical system associated with the first photocell is composed in part of a specially formed piece of fluorescent glass in which the incident light falls directly upon the surface. The optical system associated with the second photocell may employ a similar piece of fluorescent glass but in this case the glass is covered with a filter that excludes the short ultraviolet from the surface, or again, it may have only the filter over the cell without the fluorescent glass.

The fluorescent glasses are combined with their photocells so that they receive only the fluorescent light from the glasses but none of the incident light except the unavoidable stray radiations. The arrangement is such that the response of the primary photocell is definitely divided into two portions, that due to the short ultraviolet and that due to the effects of the long ultraviolet and stray visible radiations. With a mercury arc light source the response of the cell is about 60% from ultraviolet below 3200 Angstrom units and about 40% from stray visible and long ultraviolet. It is obvious if the stray visible and the long ultraviolet component is eliminated from the resultant response the indication will be only due to the desired wavelengths. Exactly this result is secured and since the second cell responds only to those radiations that are stray in the fluorescent system its response is combined with that of the first cell so as to eliminate the undesired component so that all of the readings of the meter are due to desired wavelengths.

The essential features of the meter are briefly as follows:

First, the employment of fluorescent glasses in a balanced system with photocells.

Second, the fluorescent glass exposed directly to the radiations.

Third, the elimination of the undesired radiations by transmission and absorption.

Fourth, the conversion by means of fluorescence of the desired radiations to put them into a condition that is useful for measurement and also to secure thereby the useful radiations in a mechanical direction so that they are separated from the unwanted radiations.

Fifth, the elimination from the indications of the meter the effects due to the unwanted radiations so that the response is purely that which is desired.

Measurements are made in the simplest manner upon a light source. A balancing filter is employed such as a piece of window glass (cut off about 3300 Angstrom units) or a piece of pyrex glass (cut off about 3050 Angstrom units) or a piece of corex glass (cut off about 2800 Angstrom units) and it is placed over the light receiver so as to filter all of the incident light to both receivers. The response of the instrument is then balanced to read zero. All of the responses due to light that passes the filter are thus eliminated from the reading. The filter is then removed allowing the incident light to fall directly upon the receivers.

Should there be a component present in the light that was not transmitted by the balancing filter there will then be a deflection of the indicator since the system is no longer balanced. If all of the incident light is transmitted by the filter the system is balanced after the removal of the filter and no deflection occurs. The upper limit of sensitivity of the meter is set by the limit of transmission of the balancing filter. Since filters are available with cut-offs at almost any desired wavelength in this region the meter can be employed for a number of purposes.

Measurements have been made with this meter on various kinds of light sources such as the sun, ultraviolet sun lamps, carbon arcs, incandescent lamps, quartz and glass mercury arc lamps of various ages and deterioration, high voltage discharge tubes, etc. The necessary requirements must be met in these measurements that the filter have a sharper cut-off than the light that is being measured if the results are to be reasonably accurate. This restriction is especially applicable to measurements made upon sunshine.

These and other objects which will later appear, are accomplished by the simple and practical construction and arrangement of parts hereinafter described and exhibited in the accompanying drawing, forming part hereof, and in which:

Figs. 1 and 2 are diagrammatic views of the ultraviolet ray indicating device embodying my invention, and Fig. 3 is a perspective view of the indicating device.

Referring to the drawing, in Fig. 2, the device is shown to comprise a shell 1 having in the upper wall thereof openings 2 and 3, the shell being connected by means of a cord 4 to an indicating meter 13, for example which can be of any type that has sufficient sensitivity.

Covering opening 2 in the shell is a disc 5 of fluorescent glass, and covering the opening 3 is a disc 6 of window glass. Mounted on the back of the disc 5, but spaced from the edges thereof, is an absorber 7, and positioned behind the absorber 7 is a photocell disc 8. Also positioned behind the glass disc 6 is a photocell 9, the photocells 8 and 9 extending beyond the edges of discs 5 and 6. For balancing purposes there is provided a potentiometer 10 and 11.

Special attention must be given to the fluorescing glass disc 5 as it is due to the characteristics of this glass that the desired selection of wave lengths is obtained. The glass found most useful for this purpose is a piece of fluorescing uranium glass about 4 millimeters thick and 35 millimeters in diameter, the edges being ground and polished to a true conic section at 45 degrees. The opening 2 is less than the smallest diameter of the glass 5 so as to prevent light from directly reaching the extremities of glass 5. It is apparent that light generated within glass 5 is free to pass through it to the edge where the action of the bevel is to completely reflect the light at right angles.

On the back surfaces of the glass 5, as stated above, there is attached or painted an absorbing surface, the vehicle of which has nearly the same index of refraction as the glass 5. Should this absorbing surface be completely opaque and have exactly the same index of refraction as the glass 5, there would be no reflection from the rear surface of the glass. The opaque layer 7 extends over the rear surface of glass 5 to a position directly behind the upper edge of the bevel. This arrangement prevents any of the direct incident light upon glass 5 from reaching the photocell 8. It has been found that cellulose acetate lacquers, shellacs, India ink having a shellac base, etc. are substances suitable for the absorbing surfaces described above.

The glass 5 is of such a nature that it fluoresces in all light of wavelengths below about 4300 Angstrom units; but because of its thickness and transparency, in the visible and long ultraviolet region, it does not convert light energy in these regions into fluorescence as efficiently as it does in shorter ultraviolet. For instance, the 4 millimeter thickness employed in this receiver is quite transparent to long ultraviolet at 3660 Angstrom units, since about 40% passes the glass. However, at about 3200 Angstrom units the conversion efficiency reaches totality and below this point it is practically uniform and complete. All of these shorter wavelengths are completely absorbed on the surface of this glass, or at least within a very short thickness near the surface. Since this glass is somewhat responsive to the long ultraviolet and part of the visible light, the combination of this glass and cell are only partially able to select the desired wavelengths for measurement. The unwanted portion of the response is due to the long ultraviolet and visible portions of the light.

In operation, when a balancing filter 12 is placed over glass 5, the response is entirely due to long wavelengths, which is not desired in the result. By balancing out this part of the reading, when the filter 12 is removed, the result is entirely due to the desired short wavelength. Since the balancing filter 12 is placed over both cells simultaneously and removed from both at the same time, the balance of the long ultraviolet and visible regions continues after the balancing filter 12 is removed. In other words, the balancing filter 12 is first placed over both openings 2 and 3 to obtain a balance in the indicating meter 13, after which the filter 12 is removed and the balance will continue. The balance is obtained by adjusting the potentiometer 10 and 11.

Current flows from photocell disc 8 through contacts 24 and 28 to the microammeter 13. The resistance 10, 11 is connected across the meter. Disc 9 is connected to the moving arm of resistance 11 so that its potential opposes that from disc 8 in the meter. An adjustment of the pointer 20 varies the deflection produced by the balancing photo disc 9.

The device described above is effective for almost all types of artificial sources of ultraviolet radiations, but is rather uncertain and unreliable in a variable light source such as the sun light. I have found that the form of my invention such as shown in Fig. 1, which is the preferred form, is equally effective with sun light as with artificial light sources.

In the form of the invention shown in Fig. 1, the device comprises a shell 1 having openings 2 and 3 therein, and an electrical system and meter as above described in connection with Fig. 2. Covering the opening 2 is a disc 5 of fluorescent glass, having mounted on the back thereof an absorber 7, and mounted adjacent thereto a photocell disc 8, as heretofore described. Covering the opening 3 is a similar arrangement comprising a disc 5' of fluorescent glass having mounted on the back thereof an absorber 7', and positioned adjacent thereto a photocell disc 9'. A piece of filter glass 12' is arranged to be moved to cover the opening 3 or to be moved to a position whereby all of the rays strike directly upon the fluorescent glass 5'. The filter 12' is made from the same kind of glass as the filter 12 described in connection with Fig. 2.

In operation, in measuring the intensity of short ultraviolet rays, the filter glass 12' is moved to an out of the way position so that all of the light rays strike directly upon the fluorescent glasses 5 and 5'. Since the two systems connected with 5 and 5' are identically the same, the meter 13 can then be balanced. The filter glass 12' is then moved to cover the fluorescent glass 5' so that the short ultraviolet rays will strike only the fluorescent glass 5. This will cause an unbalance in the meter 13, and the readings thereof will indicate the intensity of the short ultraviolet rays being measured.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. In a device for indicating the intensity of ultraviolet rays, a piece of fluorescent glass which is transparent to visible and long ultraviolet radiations and opaque to ultraviolet radiations below 3200 Angstrom units, said glass having a front light receiving surface and a rear surface, said glass having bevelled and polished edges, means adjacent the front surface of the glass for shielding said edges from light radiations, absorbing material capable of absorbing visible and long ultraviolet radiations transmitted through said glass covering areas of the rear surfaces of said glass equal at least to the area of the front surface of the glass exposed to light radiations, a piece of glass which is opaque to ultraviolet radiations below 3200 Angstrom units, said pieces of glass being positioned to receive substantially the same amount of radiations from the light source, photocells positioned and arranged to receive radiations through said last mentioned piece of glass and fluorescence from said fluorescent glass, an indicating meter, an electrical circuit including said photocells and said indicating meter, and a filter adapted to cover both of said glasses to enable balancing of the meter, said filter being a piece of glass which is opaque to ultraviolet radiations below 3200 Angstrom units.

2. In a device for indicating the intensity of ultraviolet rays, a piece of fluorescent glass which is transparent to visible and long ultraviolet radiations and opaque to ultraviolet radiations below 3200 Angstrom units, said glass having a front light receiving surface and a rear surface and edges, means adjacent the front surface of the glass for shielding said edges from light radiations, absorbing material covering an area of the rear surface of said glass equal at least to the area of the front surface of the glass exposed to light radiations, said absorbing material being capable of absorbing visible and long ultraviolet radiations transmitted through said glass, a piece of glass which is opaque to ultraviolet radiations below 3200 Angstrom units, photocells positioned and arranged to receive radiations through said last mentioned glass and fluorescence from said fluorescent glass, an indicating meter, an electrical circuit including said photocells and said indicating meter, and a filter adapted to cover both of said glasses to enable balancing of the meter, said filter being glass which is opaque to ultraviolet radiations below 3200 Angstrom units.

3. In a device for indicating the intensity of ultraviolet rays, a piece of fluorescent glass which is transparent to visible and long ultraviolet radiations and opaque to ultraviolet radiations below 3200 Angstrom units, said glass having a front light receiving surface and a rear surface, absorbing material covering the rear surface of said glass, means adjacent the front surface of the glass for shielding portions of said front surface so that the area of the front surface exposed to light radiations is less than the area of the rear surface covered by the absorbing material, said absorbing material being capable of absorbing visible and long ultraviolet radiations transmitted through said glass, a piece of glass which is opaque to ultraviolet radiations below 3200 Angstrom units, photocells positioned and arranged to receive radiations through said last mentioned glass and fluorescence from said fluorescent glass, an indicating meter, an electrical circuit including said photocells and said indicating meter, and a filter adapted to cover both of said glasses to enable balancing of the meter, said filter being glass which is opaque to ultraviolet radiations below 3200 Angstrom units.

4. In a device for indicating the intensity of ultraviolet rays, a light receiving surface comprising a piece of fluorescent glass which is transparent to visible and long ultraviolet radiations and opaque to ultraviolet radiations below 3200 Angstrom units and having edges, said glass having a front light receiving surface and a rear surface, an absorber positioned behind the rear surface of said glass to absorb visible and long ultraviolet radiations transmitted through the glass, means for shielding the edges of the glass from incident light at right angles to said front surface of the glass, a piece of glass opaque to ultraviolet radiations below 3200 Angstrom units, photocells positioned and arranged to receive radiations through said last mentioned piece of glass and fluorescence from said fluorescent glass, an indicating meter, an electrical circuit including said photocells and said indicating meter, and means for adjusting said meter so that when said piece of fluorescent glass is exposed to ultraviolet radiations the meter will indicate only those radiations below 3200 Angstrom units.

5. In a device for indicating the intensity of ultra violet rays, a pair of light receiving surfaces comprising pieces of fluorescent glass transparent to visible and long ultraviolet radiations and opaque to ultraviolet radiations below 3200 Angstrom units, said glasses being positioned to receive substantially the same amount of radiations from the source of radiations, absorbers positioned behind said glasses to absorb visible and long ultraviolet radiations transmitted through the glasses, said absorbers being spaced from the edges of said glasses to provide an area through which visible radiations can pass, photocells mounted in position to receive fluorescence from said glasses, an indicating meter, an electrical circuit including said photocells and said indicating meter, and a filter adapted to be moved to cover one of said fluorescent glasses, said filter being a piece of glass which is opaque to ultraviolet radiations below 3200 Angstrom units.

6. In a device for indicating the intensity of ultra violet rays, a pair of light receiving surfaces comprising pieces of fluorescent glass transparent to visible and long ultraviolet radiations and opaque to ultraviolet radiations below 3200 Angstrom units and having edges, said glasses being positioned to receive substantially the same amount of radiations from the source of radiations, said glasses having front receiving surfaces and rear surfaces, means for shielding the edges of said pieces of glass, the edges of said pieces of glass being bevelled and polished, absorbing material capable of absorbing visible and long ultraviolet radiations transmitted through said glasses, said absorbing material covering areas of the rear surfaces of said glasses equal to the areas of said glasses exposed to light radiations and spaced from the edges of the rear surfaces of said glasses to provide areas through which reflected fluorescence can pass, photocells mounted and arranged to receive radiations reflected by said bevelled edges, an indicating meter, an electric circuit including said photocells and said indicating meter, and a filter adapted to be moved to cover one of said fluorescent glasses, said filter being a piece of glass which is opaque to ultraviolet radiations below 3200 Angstrom units.

7. In a device for indicating the intensity of ultraviolet rays, a pair of light receiving surfaces comprising pieces of fluorescent glass transparent to visible and long ultraviolet radiations and opaque to ultraviolet radiations below 3200 Angstrom units and having edges, said glasses being positioned to receive substantially the same amount of radiations from the source of radiations, said glasses having front receiving surfaces and rear surfaces, means for shielding the edges of said pieces of glass, the edges of said pieces of glass being bevelled and polished, absorbing material capable of absorbing visible and long ultraviolet radiations transmitted through said glasses, said absorbing material covering areas of the rear surfaces of said glasses equal to the areas of said glasses exposed to light radiations, and spaced from the edges of the rear surfaces of said glasses to provide areas through which reflected fluorescence can pass, photocells mounted and arranged to receive fluorescence reflected by said bevelled edges, an indicating meter, an electric circuit including said photocells and said indicating meter, a filter adapted to be moved to cover one of said fluorescent glasses, said filter being a piece of glass which is opaque to ultra violet radiations, and means for adjusting said indicating meter so that when said filter covers one of said fluorescent glasses the meter will indicate only ultraviolet radiations below 3200 Angstrom units.

8. In a device for indicating the intensity of ultraviolet rays, a light receiving surface comprising a first piece of fluorescent glass which is transparent to visible and long ultraviolet radiations and opaque to ultraviolet radiations below 3200 Angstrom units and having edges, said glass having a front light receiving surface and a rear surface, the edges of said glass being bevelled and polished, and an absorber positioned behind the rear surface of said glass to absorb visible and long ultraviolet radiations transmitted through the glass, said absorber being spaced from the edges of said rear surface to provide an area through which reflected fluorescence can pass, the edges of the glass being shielded from incident light at right angles to said front and rear surfaces of the glass, a second piece of glass which is opaque to ultraviolet radiations below 3200 Angstrom units, photocells positioned and arranged to receive incident radiations through said second piece of glass and fluorescence from said first piece of glass, an indicating meter, and an electrical circuit including said photocells and said indicating meter, means for adjusting said meter so that when said piece of fluorescent glass is exposed to light radiations the meter will indicate only those radiations below 3200 Angstrom units.

LESTER F. BIRD.